United States Patent
Liu et al.

(10) Patent No.: US 11,651,685 B2
(45) Date of Patent: May 16, 2023

(54) TRAFFIC DATA ANALYSIS AND TRAFFIC JAM PREDICTION

(71) Applicant: International Business Machines Corporation, Armonk, NY (US)

(72) Inventors: Wen Liu, Beijing (CN); Shi Lei Zhang, Beijing (CN); Qin Shi, Beijing (CN); Songfang Huang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 332 days.

(21) Appl. No.: 17/029,872

(22) Filed: Sep. 23, 2020

(65) Prior Publication Data

US 2022/0092976 A1    Mar. 24, 2022

(51) Int. Cl.
    *G08G 1/0967* (2006.01)
    *G01C 21/36* (2006.01)
    *G08G 1/01* (2006.01)
    *H04N 7/18* (2006.01)
    *G01C 21/00* (2006.01)
    *G06V 20/58* (2022.01)

(52) U.S. Cl.
    CPC ....... *G08G 1/0967* (2013.01); *G01C 21/3691* (2013.01); *G01C 21/3815* (2020.08); *G01C 21/3833* (2020.08); *G01C 21/3863* (2020.08); *G06V 20/58* (2022.01); *G08G 1/0129* (2013.01); *G08G 1/0133* (2013.01); *G08G 1/0141* (2013.01); *H04N 7/185* (2013.01)

(58) Field of Classification Search
    CPC .. G08G 1/0967; G08G 1/0129; G08G 1/0133; G08G 1/0141; G01C 21/3691; G01C 21/3815; G01C 21/3863; G06V 20/58
    See application file for complete search history.

(56) References Cited

U.S. PATENT DOCUMENTS

| | | | |
|---|---|---|---|
| 7,698,055 B2* | 4/2010 | Horvitz | G08G 1/0104 342/357.31 |
| 7,962,280 B2* | 6/2011 | Kindo | G09B 29/00 340/995.15 |

(Continued)

FOREIGN PATENT DOCUMENTS

| | | |
|---|---|---|
| CN | 1776739 A | 5/2006 |
| CN | 107730427 A | 2/2018 |
| KR | 20190024971 A | 3/2019 |

OTHER PUBLICATIONS

Khan, "IBM Watson Visual Recognition: Custom Object Detection Generally Available," IBM Watson, Oct. 7, 2019, 6 pages, https://medium.com/ibm-watson/ibm-watson-visual-recognition-custom-object-detection-generally-available-906b2ae77969.

(Continued)

*Primary Examiner* — John A Tweel, Jr.
(74) *Attorney, Agent, or Firm* — Kelsey M. Skodje

(57) ABSTRACT

Traffic jam patterns can be identified and, based on historical traffic data, pre-traffic jam patterns that are likely to result in the traffic jam patterns can be identified as well. Real-time traffic data regarding a driving road of a community can be received and analyzed to determine whether the real-time traffic data match with a pre-traffic jam pattern. If the data matches a pre-traffic jam pattern, an alerting signal for predicting a traffic jam can be transmitted.

20 Claims, 14 Drawing Sheets

(56) References Cited

U.S. PATENT DOCUMENTS

| | | | | |
|---|---|---|---|---|
| 8,065,073 B2* | 11/2011 | Downs | ................ | G08G 1/0104 |
| | | | | 340/995.13 |
| 8,700,294 B2 | 4/2014 | Downs et al. | | |
| 10,037,604 B2 | 7/2018 | Datta et al. | | |
| 2004/0230376 A1* | 11/2004 | Ichikawa | ............... | G01C 21/26 |
| | | | | 702/2 |
| 2010/0185382 A1* | 7/2010 | Barker | ................ | G08G 1/0969 |
| | | | | 715/764 |
| 2021/0118297 A1* | 4/2021 | Kawasaki | .......... | G01C 21/3476 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

TRAFFIC DATA ANALYSIS AND TRAFFIC JAM PREDICTION

BACKGROUND

The present disclosure generally relates to data processing, and more specifically, relates to methods, systems or computer program products for traffic data training and/or traffic jam prediction.

Traffic congestion is one of the largest traffic problems, resulting in increased delays, pollution, and lost productivity. Attempts to warn drivers of traffic congestion are a well-established attempt to mitigate the negative impacts of traffic jams. For example, morning newscasts often dedicate a segment specifically to traffic, many roads have signs that can be updated to display traffic information, etc.

SUMMARY

The present disclosure generally relates to data processing, and more specifically, relates to methods, systems or computer program products for traffic data training and/or traffic jam prediction.

Aspects of an embodiment of the present disclosure disclose a method, computer program product and/or system that performs the following operations (not necessarily in the following order) for predicting traffic jam. A processor receives real-time traffic data regarding at least one driving road of at least one community. A processor determines whether the real-time traffic data match with at least one pre-traffic jam pattern. Responsive to the real-time traffic data being matched with the at least one pre-traffic jam pattern, a processor transmits an alerting signal for a traffic jam.

Aspects of an embodiment of the present disclosure disclose a method, computer program product and/or system that performs the following operations (not necessarily in the following order) for training traffic data. A processor receives historical traffic data regarding at least one driving road of at least one community. A processor identifies at least one traffic jam pattern from the received historical traffic data. Responsive to the at least one traffic jam pattern being identified, a processor identifies at least one pre-traffic jam pattern with a likelihood of leading to the traffic jam pattern.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
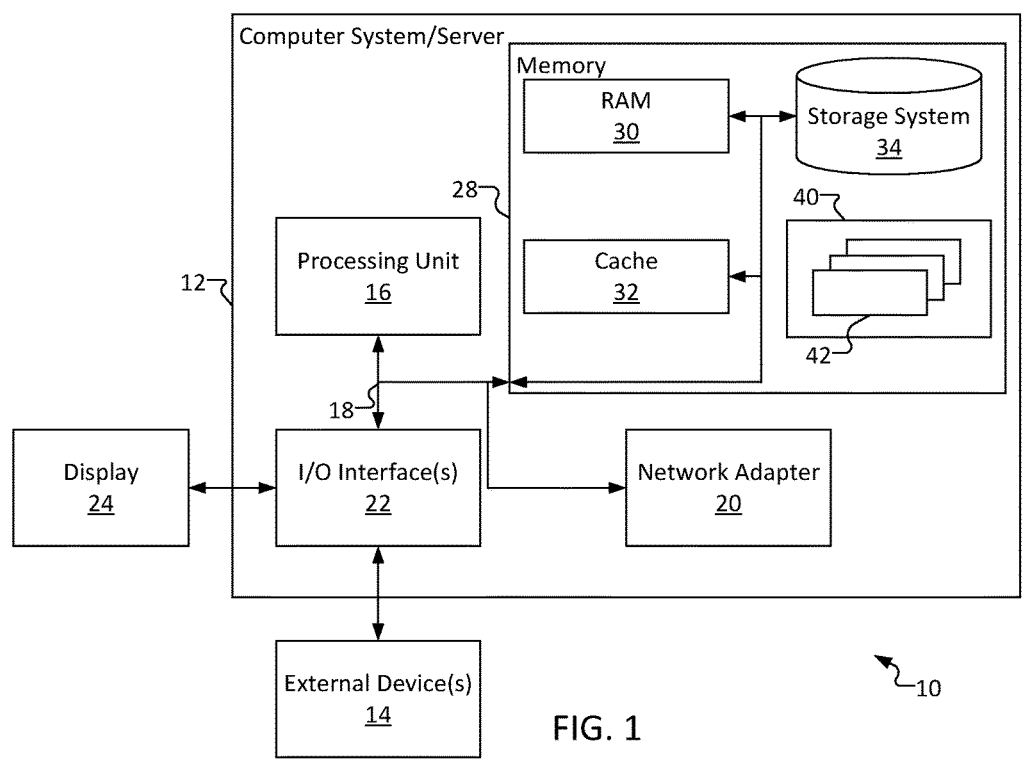
FIG. 1 depicts a cloud computing node according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to predict traffic jams. More particular aspects relate to a system to receive real-time traffic data, determine that the real-time traffic data corresponds to a pre-traffic jam traffic pattern, and transmit a traffic jam prediction alert.

Some embodiments will be described in more detail with reference to the accompanying drawings, in which the embodiments of the present invention have been illustrated. However, the present invention can be implemented in various manners, and thus should not be construed to be limited to the embodiments disclosed herein. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
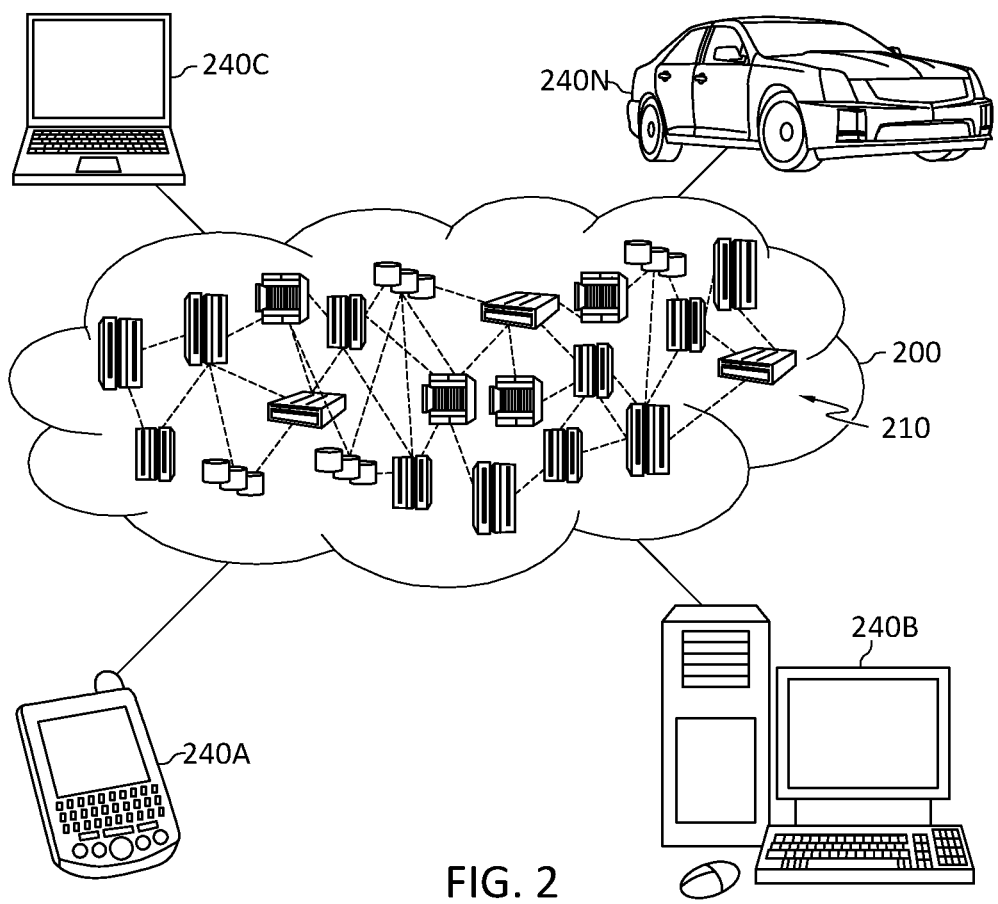
FIG. 2 depicts a cloud computing environment according to an embodiment of the present disclosure.

Referring now to FIG. 2, illustrative cloud computing environment 200 is depicted. As shown, cloud computing environment 200 comprises one or more cloud computing nodes 210 with which local computing devices used by cloud consumers, such as, for example, personal digital assistant (PDA) or cellular telephone 240A, desktop computer 240B, laptop computer 240C, and/or automobile computer system 240N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 240A-N shown in FIG. 2 are intended to be illustrative only and that computing nodes 210 and cloud computing environment 200 can communicate with any type of computerized device over any type of network and/or network addressable connection (e.g., using a web browser).

Figure 3:
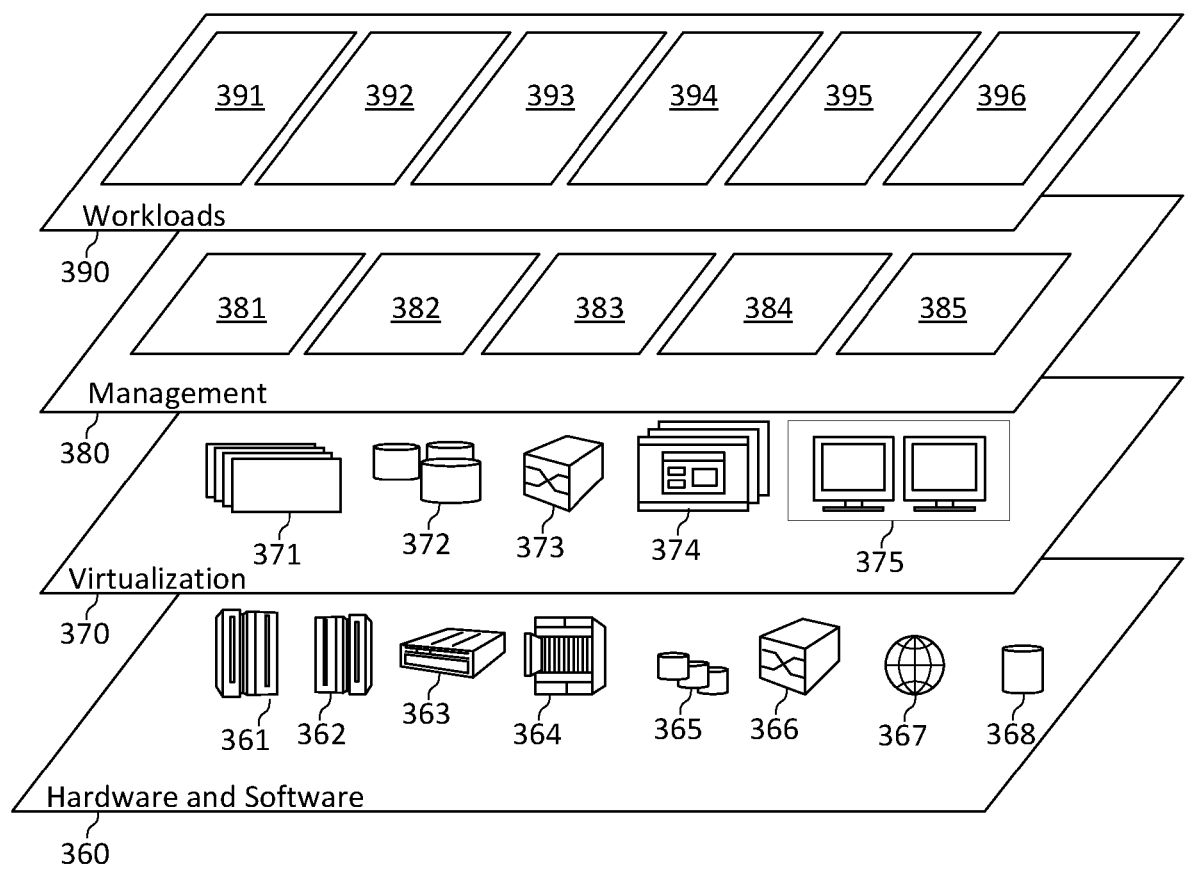
FIG. 3 depicts abstraction model layers according to an embodiment of the present disclosure.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and traffic training data and traffic prediction 396.

Traffic prediction is the task of forecasting real-time traffic information based on real-time traffic data and historical traffic data, such as traffic flow, average traffic speed and traffic incidents, etc. Traffic prediction can be advantageous wherever vehicular traffic is present, such as highways, urban regions, and even smaller "limited areas." A "limited area," as discussed herein, refers to a region such as a community, a neighborhood, etc.

Real-time traffic data usually can be collected from navigation applications, such as those installed on mobile devices (smart phones and the like) by users. However, people often opt not to use navigation applications in a limited area, so navigation applications may be unable to collect sufficient real-time traffic data to be able to predict and/or detect traffic congestion in the limited area. A typical example of the limited area could be a community with narrow roads (sometimes even one-way roads), closely grouped buildings, vehicles commonly parked on the road, etc. When a driver drives within a community that the driver is familiar with (for example, where the driver lives), normally no navigation applications will be used by the driver. Further, a relatively high proportion of drivers in residential communities may be familiar with the community, resulting in a relative lack of real-time traffic data available to predict traffic jams within the community. In order to make a prediction for a community, embodiments of this disclosure provide an innovative method/system/computer program product to analyze traffic data and/or predict a traffic jam.

Figure 4:
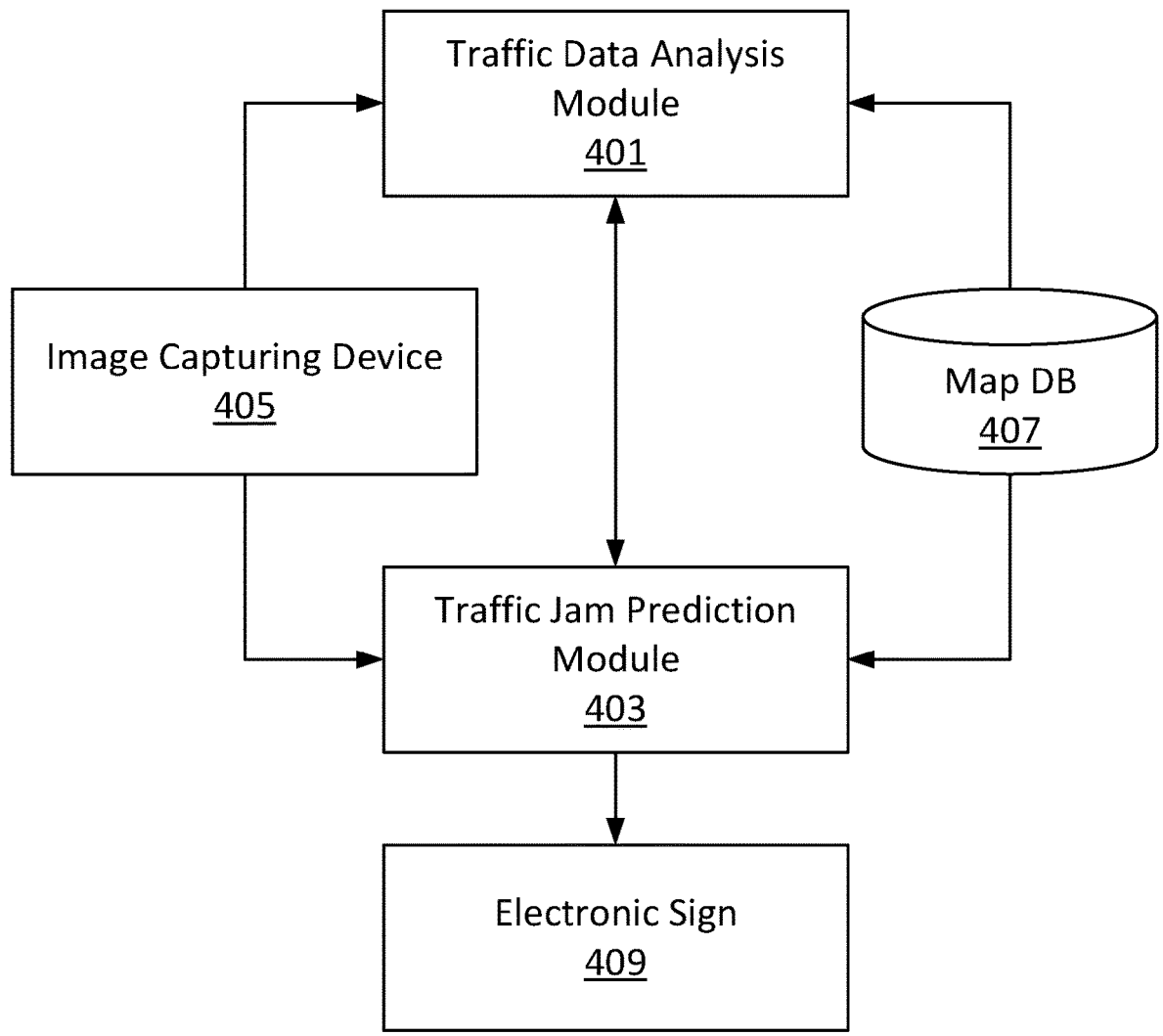
FIG. 4 depicts a system diagram of training traffic data and predicting traffic jam in accordance with embodiments of the present disclosure.

FIG. 4 depicts a diagram of a system 400 for analyzing traffic data and predicting a traffic jam in accordance with embodiments of the present disclosure. The system 400 includes a traffic data analysis module 401 and a traffic jam prediction module 403. The traffic data analysis module 401 may be configured to determine historical traffic data associated with at least one driving road of at least one community, wherein the historical traffic data can be determined based on a map of the community from map database (DB) 407 and historical traffic images taken from image capturing device 405 (for example, roadside cameras installed in at least one place associated with the at least one driving road in the community).

Throughout this disclosure, reference is made to multiple types of pattern, particularly "traffic jam patterns" and "pre-traffic jam patterns." As used herein, a "traffic jam pattern" can be a pattern (e.g., a distribution of vehicles/velocity of vehicles/number of vehicles on a road) corresponding to a traffic jam. More specifically, the traffic jam pattern can represent at least one vehicle changing from a moving state to a stopped state in a driving road and staying in the stopped state for a period longer than a stop time threshold (for example 1 minute). The "driving road," as used herein, refers to a portion of a road dedicated exclusively to driving, as opposed to other portions of a road which may be utilized for other purposes besides (or in addition to) driving, like bicycle lanes, a shoulder, on-street parking, etc. The driving road can be recognized from the image capturing device 405 by using image analysis technology, or it could be identified from the map. The traffic jam pattern can include an array of tags representing presence of vehicles in a lattice map of a driving road that are in a traffic jam.

A "pre-traffic jam pattern" could be a pattern, such as a particular distribution of vehicles on a road, with a particular likelihood of leading to a traffic jam pattern, such as a likelihood higher than a likelihood threshold (for example, 50%). In other words, while a pre-traffic jam pattern may not represent or depict vehicles that are actively in a traffic jam (e.g., vehicles in a pre-traffic jam pattern may still be moving, even relatively quickly), the pattern of vehicles on the road may be recognized as one frequently associated as a precursor to a traffic jam. As a simple example, a minor road obstacle (such as a stopped vehicle, a portion of a fallen tree, etc. on a driving road) may hinder any vehicles attempting to use the driving road but may not cause a traffic jam immediately; intermittent vehicles may be briefly slowed, but may still be able to circumnavigate the obstacle without building up traffic. However, given a sufficient traffic flow, traffic will begin to back up, eventually resulting in a traffic jam. Thus, a pattern representing an obstacle and a particular number/density of vehicles may be recognized as a pre-traffic jam pattern. The pre-traffic jam pattern can include an array of tags representing presence (or absence) of vehicles in a lattice map of a driving road which may lead to the traffic jam pattern.

It is noted that the driving road of the traffic jam pattern could be different from the driving road of the pre-traffic jam pattern, because driving status of vehicles in one road in an early stage can lead to traffic jam in another road later on. It is also noted that embodiments of the present disclosure can use the above rules to decide whether a pattern constitutes (or will likely result in) a traffic jam without depending on any label being manually added to recognize traffic jams. Additionally, the traffic data analysis module 401 can also provide a likelihood of a given pre-traffic jam pattern actually leading to a traffic jam pattern. Traffic data analysis module 401 can similarly provide different such likelihoods for each of a plurality of pre-traffic jam patterns.

More specifically, the historical traffic images can be time series data including a series of photos with a series of timestamps marking times that the photos were taken. The traffic data analysis module 401 can combine the historical traffic images with the corresponding map received from the map DB 407. If a traffic jam is detected or predicted, system 400 may transmit an alert notification to an electronic sign 409 to cause it to display a warning message.

Figure 5:
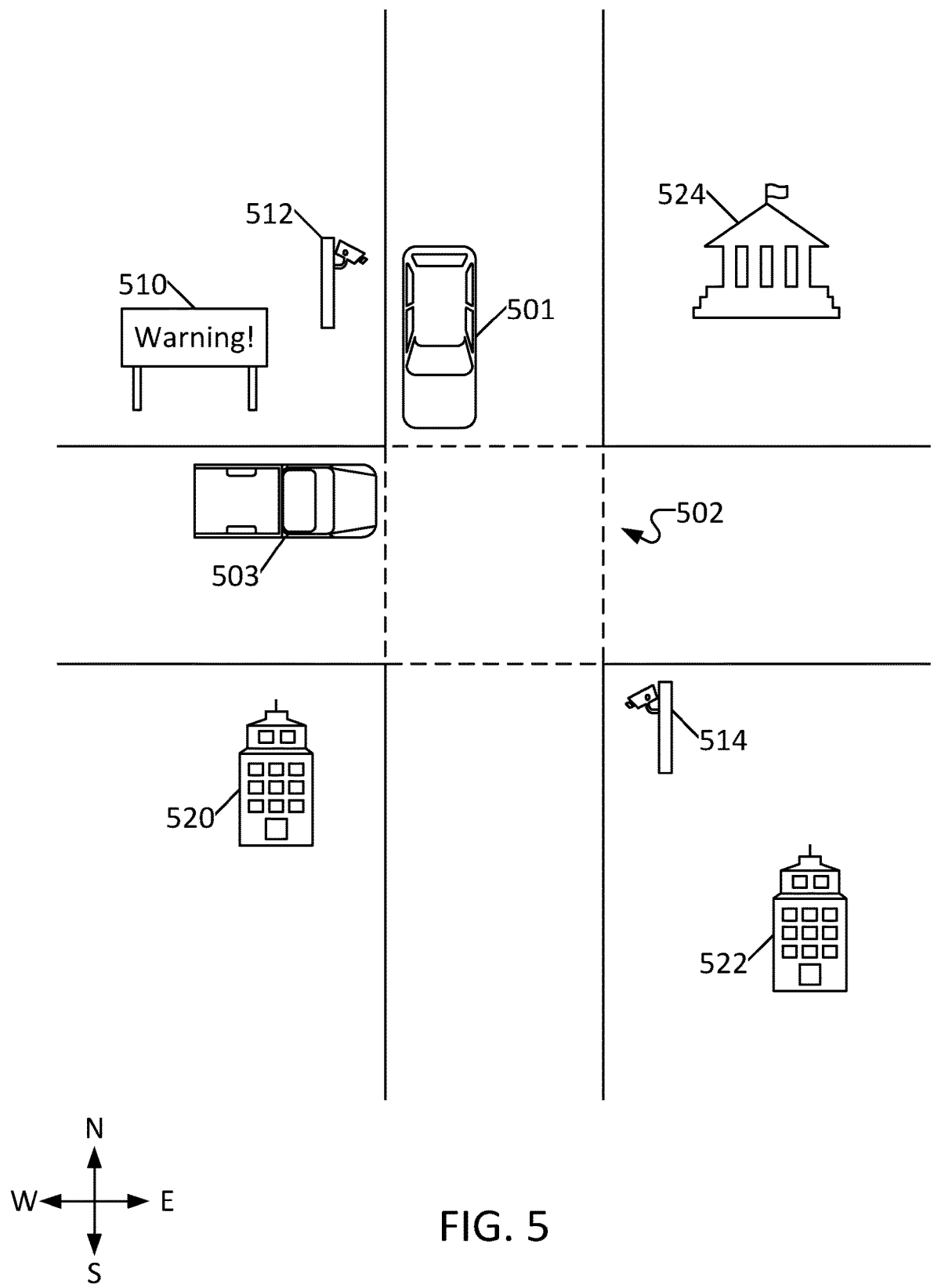
FIG. 5 depicts a schematic diagram of traffic jam in accordance with embodiments of the present disclosure.

FIG. 5 depicts a schematic diagram 500 of a traffic jam in accordance with embodiments of the present disclosure. As shown in FIG. 5, a first vehicle 501 is driving from the north to the south and is close to an intersection 502, while a second vehicle 503 is driving from the west to the east and is approaching intersection 502 as well, which leads to the traffic jam, and both the first vehicle 501 and the second vehicle 503 stop at intersection 502 for a duration. Diagram 500 also includes an electronic sign 510, cameras 512 and 514, and buildings 520, 522 and 524. In particular, cameras 512 and 514 may be examples of image capturing device 405, as described above with reference to FIG. 4.

Furthermore, the traffic data analysis module 401 can transform an ordinary map obtained from the map DB 407 into a lattice map if it is originally not a lattice map. The lattice map can be obtained by splitting at least a part of the map of the at least one community into a plurality of lattices.

Figure 6:
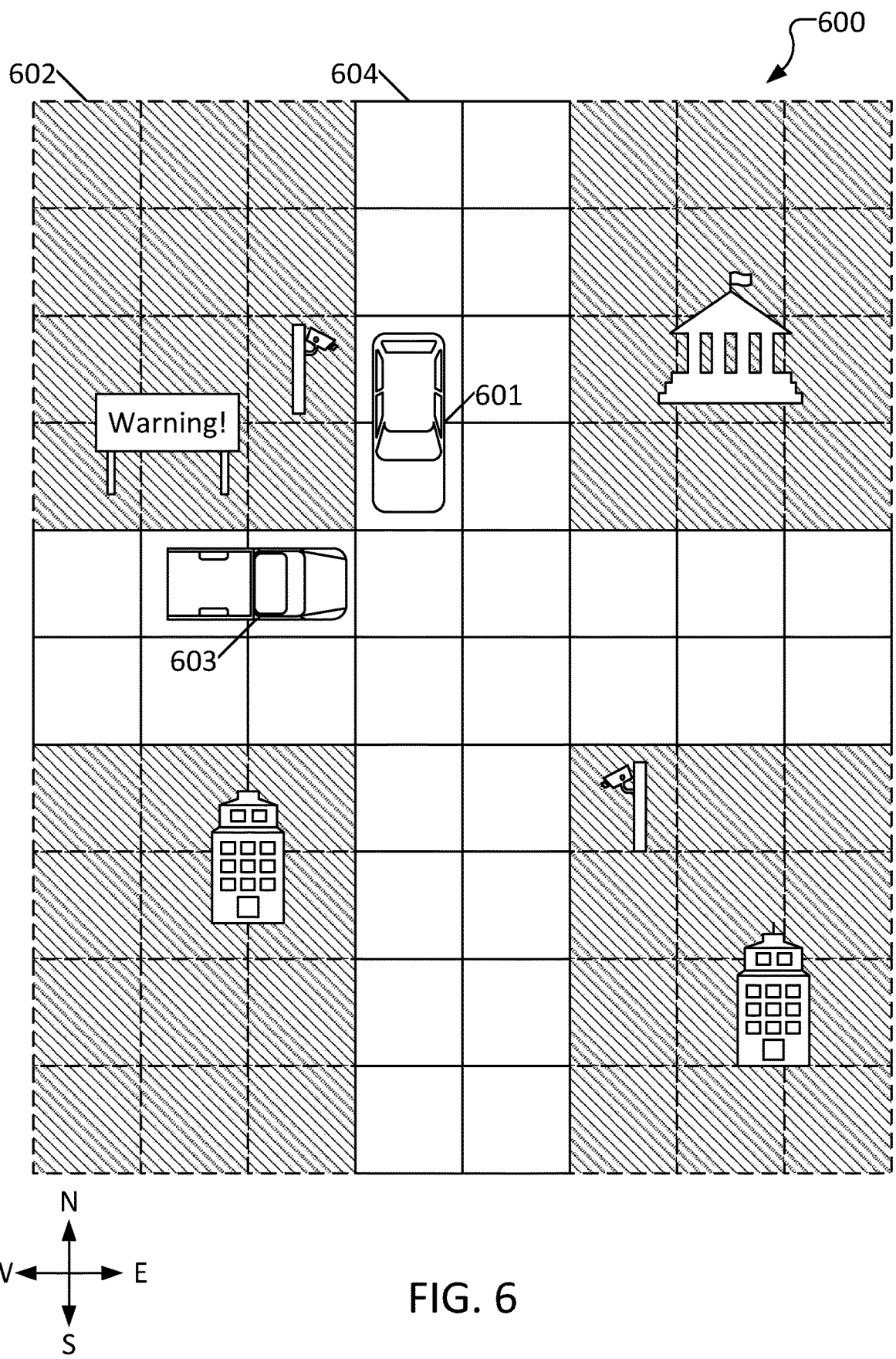
FIG. 6 depicts a schematic diagram of a lattice map of a traffic jam in accordance with embodiments of the present disclosure.

FIG. 6 depicts a schematic diagram of a lattice map 600 of a traffic jam in accordance with embodiments of the present disclosure. Referring to FIG. 6, hatched regions of lattice map 600 (such as hatched region 602) can indicate the part that is not driving road, while the non-hatched regions of lattice map 600 (such as non-hatched region 604) can indicate the driving road, which is the part of the map that is concerned in accordance with embodiments of the present disclosure. It should be noted that the hatching is provided merely for purposes of aiding in understanding the illustration. The manner to split a map into lattices can vary, depending on granularity required to present a map. A "resolution" of lattice map 600 (e.g., a size of individual regions) can vary. In some embodiments, the size of individual regions of lattice map 600 can be dynamically changed to present a map. Even more, different parts of the map can apply different sizes of lattice. It should be understood by those skilled there is no limitation with regards to the size of lattice in accordance with embodiments of the present disclosure. Lattice map 600 may depict traffic jam 500 discussed above with reference to FIG. 5 (e.g., first vehicle 601 may be first vehicle 501, second vehicle 603 may be second vehicle 503, etc.)

Additionally, the traffic data analysis module 401 can convert the lattice map as shown in in FIG. 6 into an array of tags representing presence (or absence) of a vehicle in the lattice map, as the determined historical traffic data. The determined historical traffic data can be used to identify both the traffic jam pattern and the non-traffic jam pattern, the latter of which can also include the pre-traffic pattern. The traffic data analysis module 401 can identify at least one traffic jam pattern from the received historical traffic data.

Figure 7:
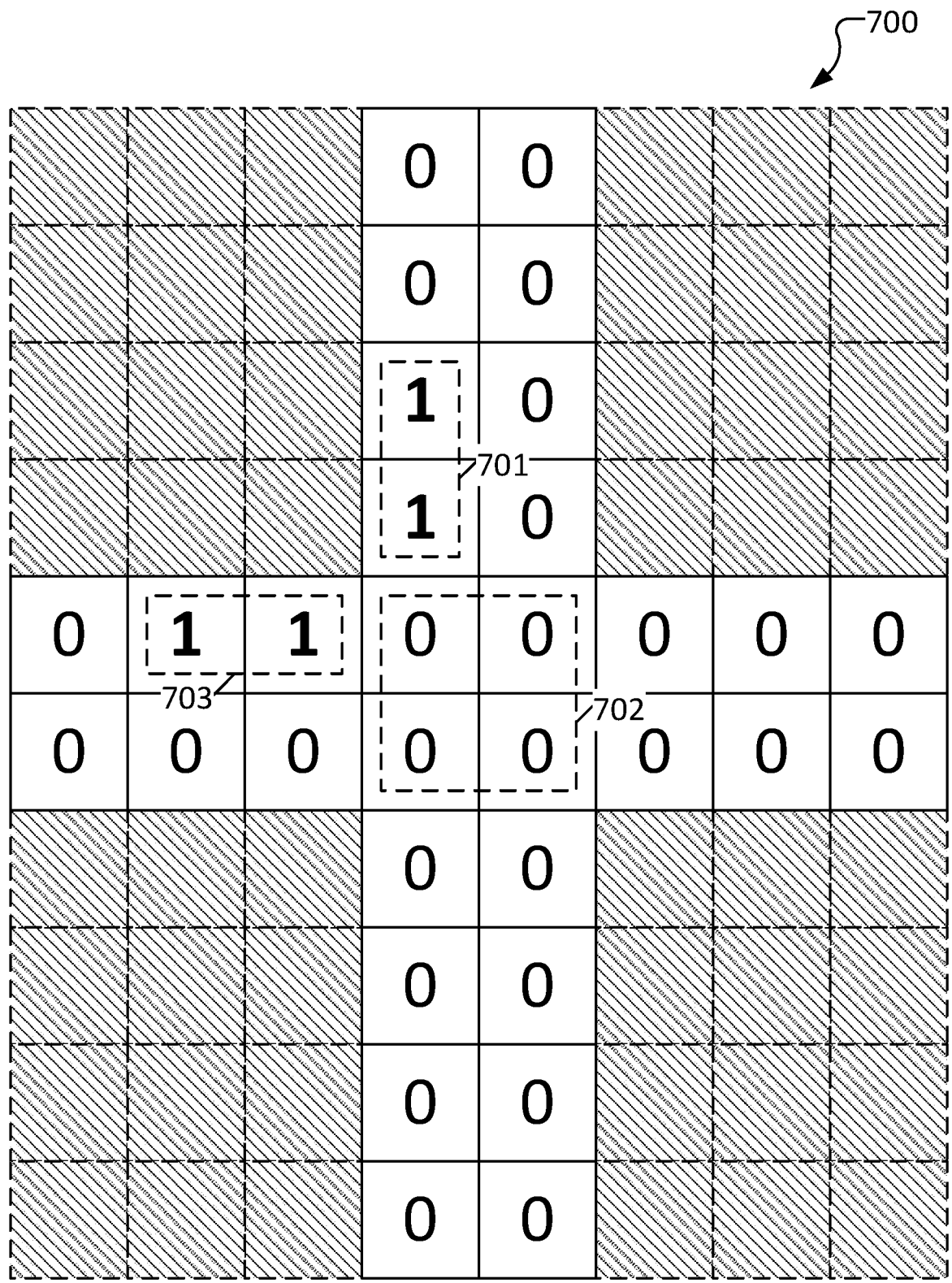
FIG. 7 depicts an array of tags as a traffic jam pattern in accordance with embodiments of the present disclosure.

FIG. 7 depicts an array of tags of a traffic jam pattern 700 in accordance with embodiments of the present disclosure. Referring to FIG. 7, tag "1" can indicate the presence of at least a part of a vehicle in a lattice, while tag "0" can indicate no presence of any part of a vehicle in the lattice. Therefore, two or more tags of "1" grouped together can indicate a whole vehicle. For example, group of tags 701 may represent a first vehicle, while group of tags 703 may represent a second vehicle. This can be additionally verified if the two tags of "1" move together, or if the two tags of "1" are "surrounded" by tags of "0," etc. If a vehicle changes from a moving state to a stopped state on a driving road and stays in the stopped state for a period longer than a stop time threshold (for example 1 minute), then it could indicate a traffic jam. The traffic jam pattern 700 shown in FIG. 7 corresponds to the lattice map 600 shown in FIG. 6. The presence of the at least one vehicle can be detected by any object detection method (such as single shot multi-box detector (SSD), Region Convolutional Neural Network (RCNN), fast-RCNN, etc.) from at least one image of the at least one driving road.

Responsive to the at least one traffic jam pattern being identified, the traffic data analysis module 401 can also identify at least one pre-traffic jam pattern, each with a likelihood of leading to the traffic jam pattern. The at least one pre-traffic jam pattern can be one or more limited numbers of patterns ahead of the traffic jam pattern. For example, a traffic jam such as traffic jam pattern 700 may occur at 8:00 AM when a first vehicle (represented by tags 701) and a second vehicle (represented by tags 703) meet at intersection 702. An image taken before the traffic jam, such as at 7:59 am, may show positions of the first vehicle and the second vehicle one minute before the traffic jam. An example of such an image (including positions of two vehicles before a traffic jam) is illustrated in FIG. 8.

Figure 8:
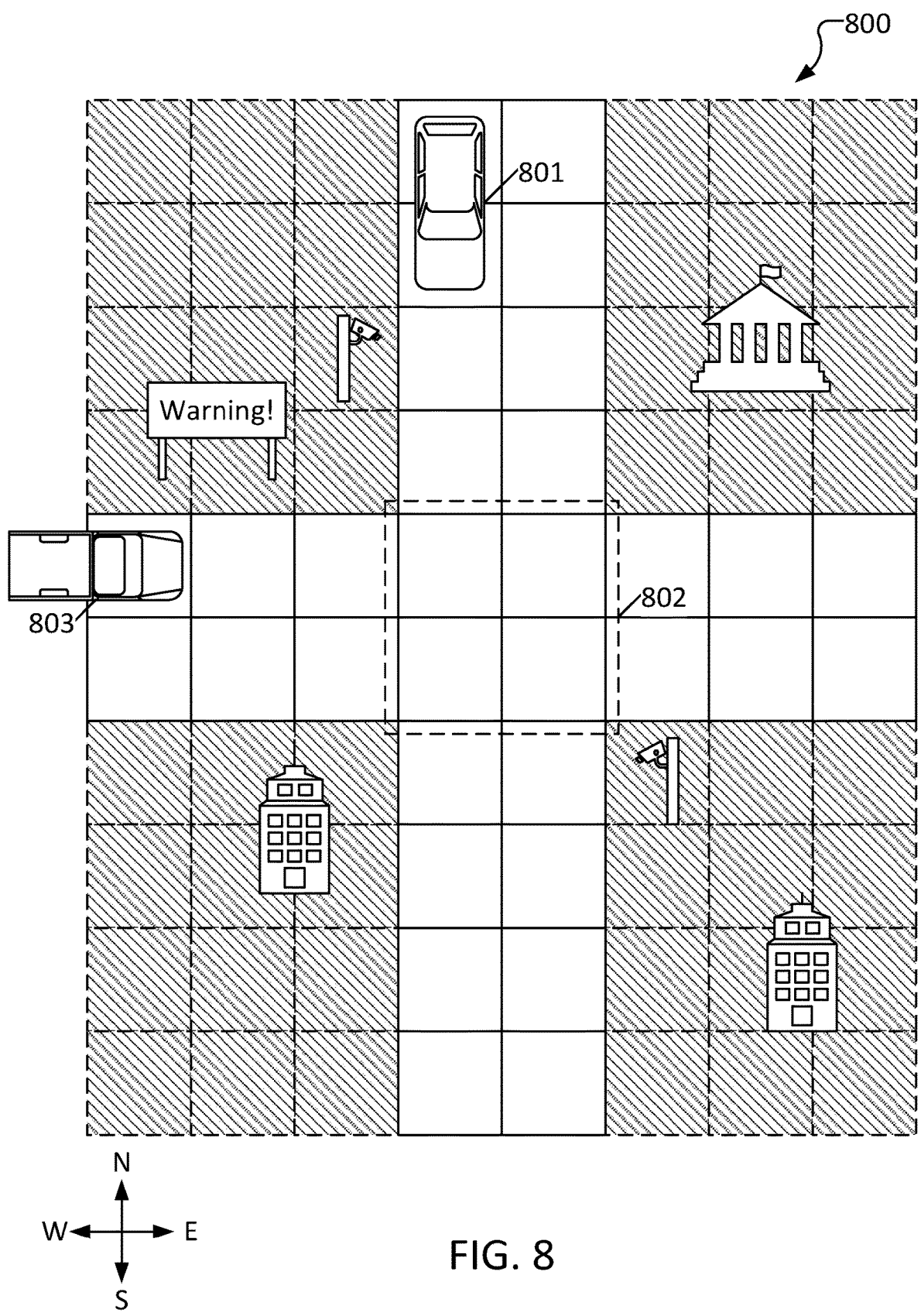
FIG. 8 depicts a schematic diagram of a lattice map in a pre-traffic jam in accordance with embodiments of the present disclosure.

FIG. 8 depicts a schematic diagram of a lattice map 800 in a pre-traffic jam in accordance with embodiments of the present disclosure. As shown in lattice map 800, a first vehicle 801 is approaching an intersection 802 from the north and a second vehicle 803 is approaching intersection 802 from the west. Lattice map 800 may be generated from, for example, an image captured at a particular time (e.g., 1 minute) before a traffic jam pattern, such as lattice 600 of FIG. 6.

Figure 9:
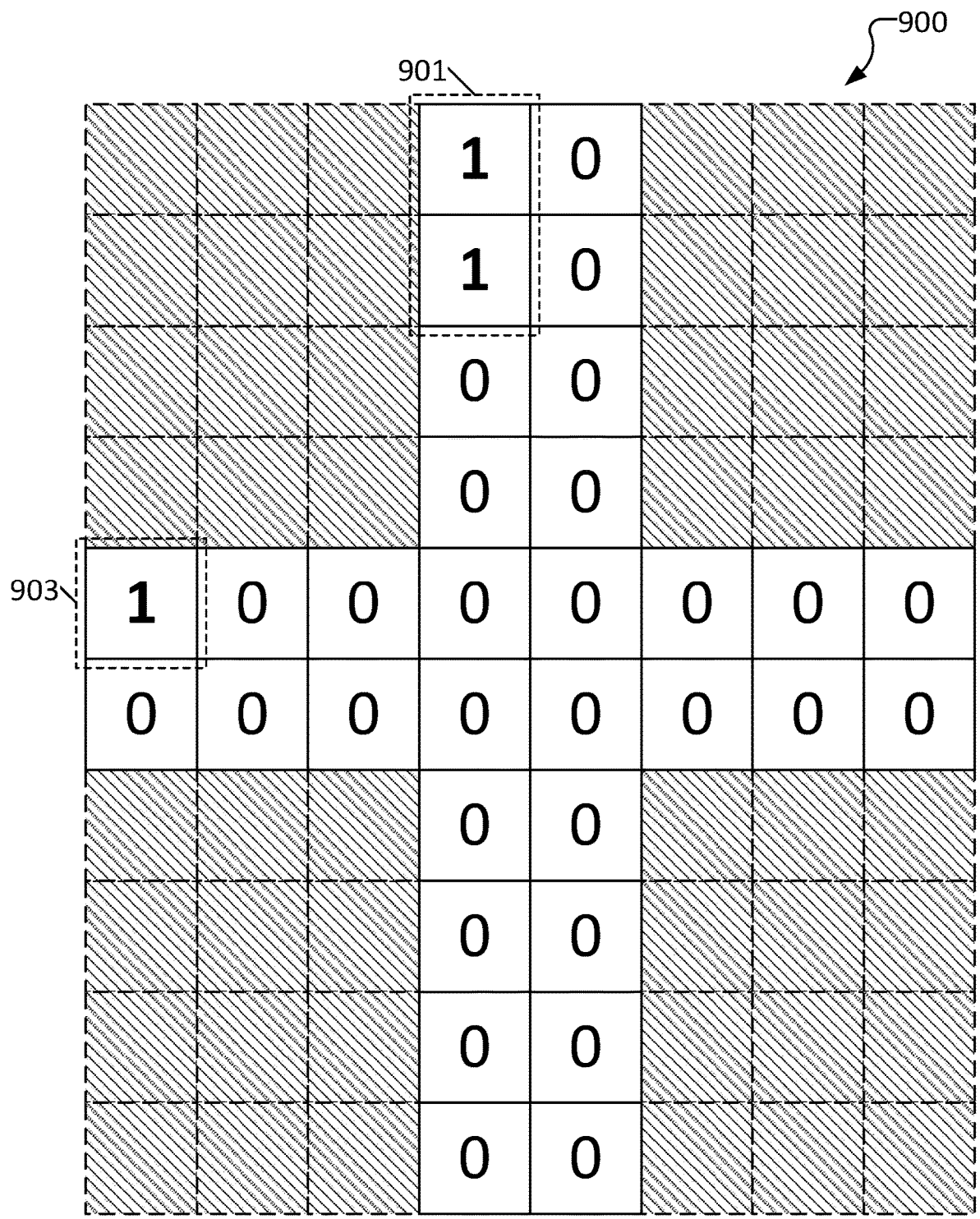
FIG. 9 depicts an array of tags as a pre-traffic jam pattern in accordance with embodiments of the present disclosure.

FIG. 9 depicts an array of tags as a pre-traffic jam pattern 900 in accordance with embodiments of the present disclosure. Pre-traffic jam pattern 900 uses two groups of tags "1" to show positions of vehicles. For example, a first group of "1" tags 901 may represent a first vehicle and a group of "1" tags 903 may represent a second vehicle (noting that group of "1" tags 903 only includes a single "1" tag, as the second vehicle may be partially out of view of the image from which pre-traffic jam pattern 900 is generated). Pre-traffic jam pattern 900 may describe positions of the vehicles at a particular time (e.g., 1 minute) before a traffic jam. For example, if traffic jam pattern 700 were detected or occurred at 8:00 AM, pre-traffic jam pattern 900 may depict the same intersection at 7:59 AM. It is understood that there could be multiple pre-traffic jam patterns corresponding to one traffic jam pattern, because there could be multiple images before the traffic jam. For example, there could be other pre-traffic patterns generated at 7:58 am, 7:57 am, etc. Generally, the longer the time difference between the pre-traffic jam pattern and the traffic jam pattern, the weaker the correlation between the pre-traffic jam pattern and the traffic jam pattern and the lower the likelihood of the pre-traffic jam pattern leading to the traffic jam pattern. Once the pre-traffic pattern is defined as a pattern with a likelihood of leading to the traffic jam pattern higher than a likelihood threshold, the pre-traffic pattern can be determined as those having relatively strong correlation with the traffic jam.

It should be understood that the likelihood of leading to the traffic jam pattern of the pre-traffic jam pattern can be decided by various manners. For example, the traffic data analysis module 401 can determine how many times the same non-traffic pattern will finally lead to a traffic jam pattern within a certain period of time (for example 3 minutes). This certain period of time can be set depending on a variety of factors, such as, for example, road complexity of the community, congestion tolerance, etc. If, within all the historical traffic data, there are a total of 6 times that a non-traffic jam pattern (such as pattern 800 as illustrated in FIG. 8, before it is specifically identified as a pre-traffic jam pattern) finally leads to a traffic jam (such as pattern 600 as illustrated in FIG. 6) within a certain period of time, while there are a total of 4 times that the non-traffic pattern finally leads to no traffic jam within the same certain period of time, then the likelihood of that particular non-traffic jam pattern leading to a traffic jam pattern could be 60%. The non-traffic jam pattern could be, therefore, decided as the pre-traffic jam pattern because its likelihood of leading to a traffic jam pattern is higher than the likelihood threshold (50%). It should be understood by a person skilled in the art that other classification methods (neural network, support vector machines (SVMs), etc.) to determine the likelihood of leading to the traffic jam pattern can be used, and the above example is only provided for purposes of illustration without suggesting any limitation.

Referring back to FIG. 8, first vehicle 801 driving from north to south and second vehicle 803 driving from west to east may result in congestion (such as traffic jam 500 as shown in FIG. 5). However, if first vehicle 801 as shown in FIG. 8 drove from south to north instead, it may not result in congestion with second vehicle 803 (as it may have already passed through intersection 802 by the time shown by FIG. 8). Therefore, driving direction can be an important factor of traffic jam detection.

Figure 10A:
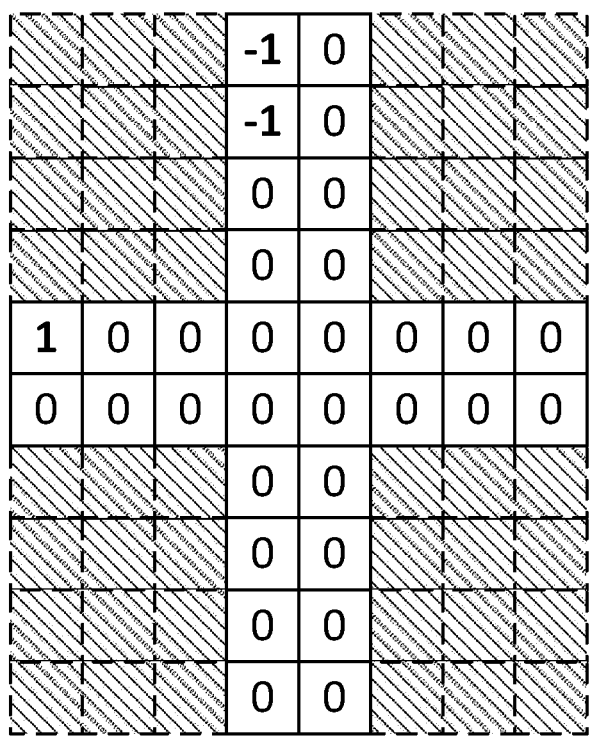
FIG. 10A depicts an alternative array of tags representing direction of vehicles, consistent with several embodiments of the present disclosure.

FIG. 10A depicts an alternative array of tags 1010 representing direction of vehicles, consistent with several embodiments of the present disclosure. Positive and negative signs can be further used to describe directions of the corresponding vehicle. For example, a positive sign can indicate moving direction from west to east or from south to north, while a negative sign can indicate moving direction from east to west, or vice versa. It should also be understood that more complicated characters/signs/numbers/letters can be used in practice to describe more complicated directions.

Figure 10B:
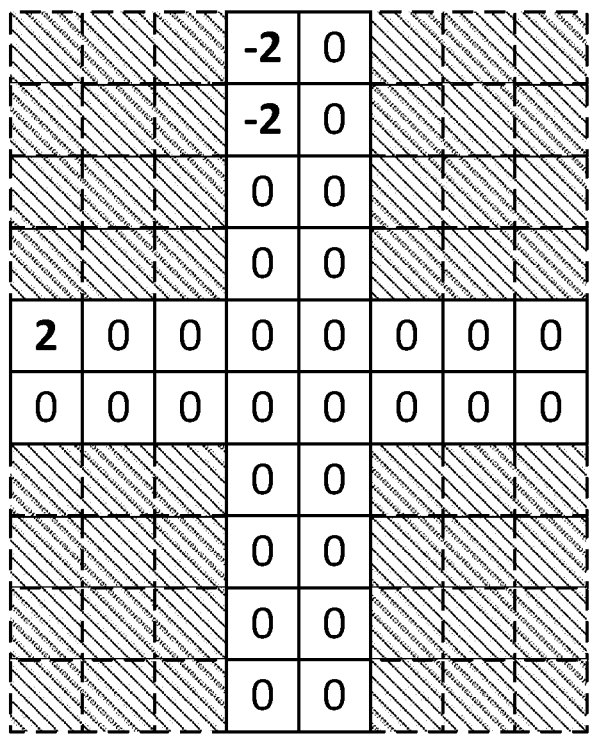
FIG. 10B depicts an alternative array of tags representing speed of vehicles, consistent with several embodiments of the present disclosure.

FIG. 10B depicts an alternative array of tags 1020 representing speed of vehicles, consistent with several embodiments of the present disclosure. For example, tag "2" may indicates a relatively high speed (speed higher than a speed threshold), while "1" may indicate relatively low speed (speed lower than or equal to a speed threshold). It could be understood that apart from (or in addition to) direction, speed is another important factor that may impact the result or cause of traffic jams. For example, referring again to FIG. 8, if both first vehicle 801 and second vehicle 803 are traveling at high speed, congestion (or even a collision) may be more likely to result, while if only first vehicle 801 is traveling at high speed (but second vehicle 803 travels at relatively low speed), then congestion may be less likely to occur in the end (for example, first vehicle 801 may pass through intersection 802 entirely before second vehicle 803 approaches it, so neither vehicle may need to slow down). Therefore, speed can be another important factor of traffic jam.

Therefore, identified pre-traffic jam patterns can be used to predict a traffic jam by the traffic jam prediction module 403 shown in FIG. 4 in accordance with embodiments of the present disclosure. The traffic jam prediction module 403 can receive real-time traffic data regarding to at least one driving road of at least one community. Specifically, the traffic jam prediction module 403 can obtain at least one real-time image from an image capturing device 405 installed in at least one place associated with at least one driving road. The traffic jam prediction module 403 can then detect presence of at least one vehicle from the real-time image by any object detection method (such as SSD, RCNN, fast RCNN, etc.). Also, the traffic jam prediction module 403 can obtain a lattice map from the map DB 407 and combine the real-time image with the lattice map. The lattice map can be obtained by splitting at least a part of a map of the at least one community into a plurality of regions, which can be performed by the traffic jam prediction module 403 or be obtained directly from the map DB 407. Finally, the received real-time traffic data can include an array of tags representing presence (as well as, in some embodiments, speed and/or direction) of at least one vehicle in a lattice map of the at least one driving road, as illustrated in FIG. 7 or FIG. 9.

The traffic jam prediction module 403 can also determine whether the real-time traffic data match with at least one pre-traffic jam pattern, such as pre-traffic jam pattern 900 illustrated in FIG. 9. This can be achieved by comparing the real-time traffic data and the pre-traffic jam pattern to find if they are the same or similar. Again, the pre-traffic jam pattern can be a pattern with a likelihood of leading to a traffic jam higher than a likelihood threshold. The real-time traffic data matching with any pre-traffic jam pattern can indicate a driver is likely to encounter a traffic jam if the driver keeps on driving.

Therefore, responsive to the real-time traffic data being matched with the at least one pre-traffic jam pattern, the traffic jam prediction module 403 can transmit an alerting signal for predicting a traffic jam. More specifically, the traffic jam prediction module 403 can cause an electronic sign 409 in the at least one community to display an alert message. The electronic sign 409 can be installed, for example, on the roadside of the driving road to alert the driver. Additionally, the traffic jam prediction module 403 can also display a calculated likelihood of a traffic jam based on a detected pre-traffic jam pattern.

Figure 11:
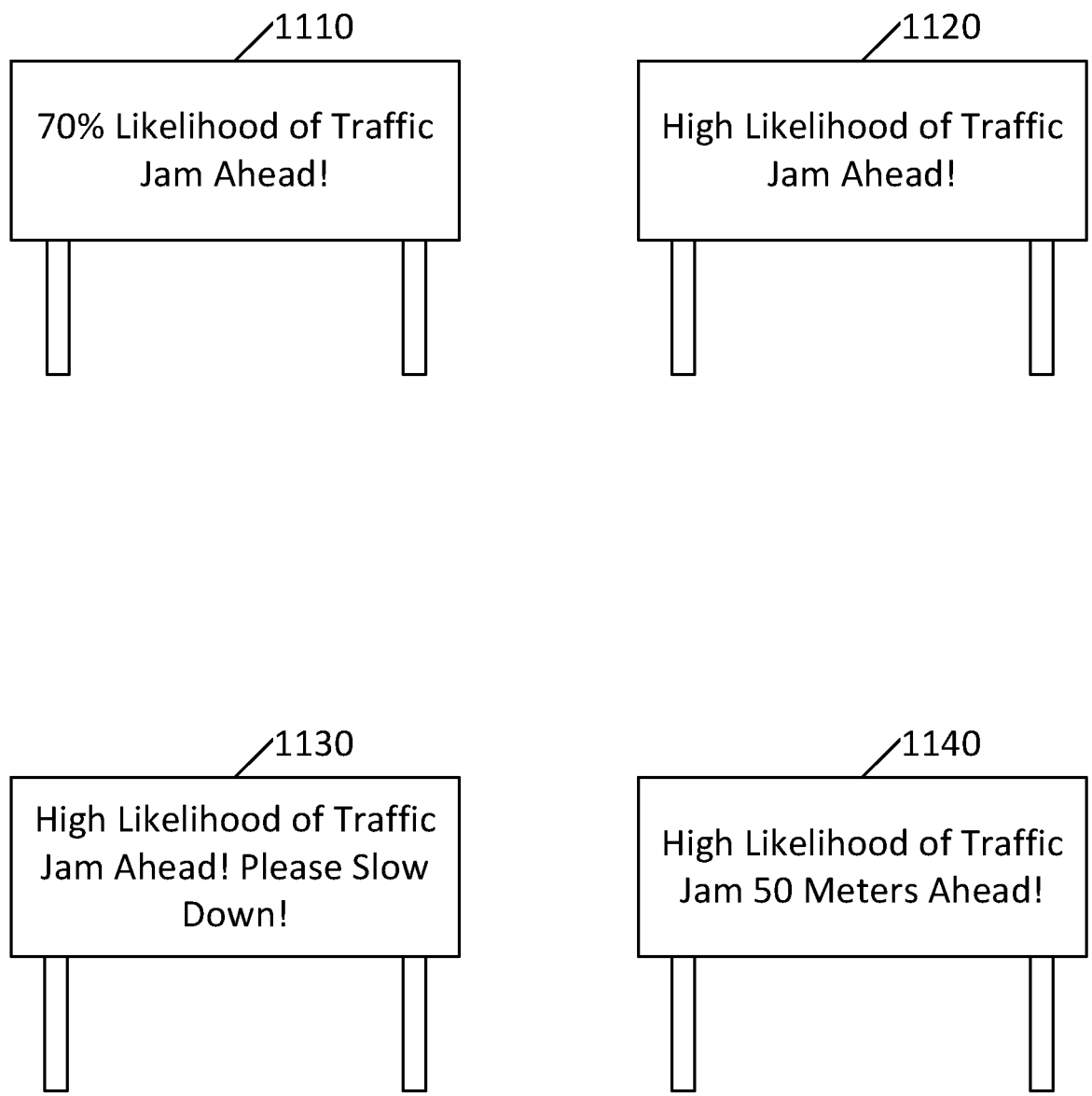
FIG. 11 depicts schematic diagrams of electronic signs in accordance with embodiments of the present disclosure.

FIG. 11 depicts schematic diagrams of electronic signs 1110-1140 in accordance with embodiments of the present disclosure. For example, the alerting message shown by electronic sign 1110 is "70% Likelihood of Traffic Jam Ahead!", the alerting message shown by electronic sign 1120 is "High Likelihood of Traffic Jam Ahead!", the alerting message shown by electronic sign 1130 is "High Likelihood of Traffic Jam Ahead! Please Slow Down!", and the alerting message shown by electronic sign 1140 is "High Likelihood of Traffic Jam 50 Meters Ahead!". It should be understood by those skilled in the art that the content of the alerting message can vary based on actual needs without being limited to the examples shown above.

Alternatively, the traffic jam prediction module 403 can transmit an alerting message to a device (such as a device of a driver, an automated vehicle, a transit authority, etc.) for the purpose of warning. The device of the driver can include, for example, a smartphone, a wearable device, an inherent device of the vehicle, the vehicle itself, etc. In yet another example, the traffic jam prediction module 403 can transmit an alerting message to a loudspeaker installed in the at least one community to warn the driver. It should be understood by a person in the art that other manners of transmitting the alerting message can be used as well; the above examples are merely provided for purposes of illustration only.

Figure 12:
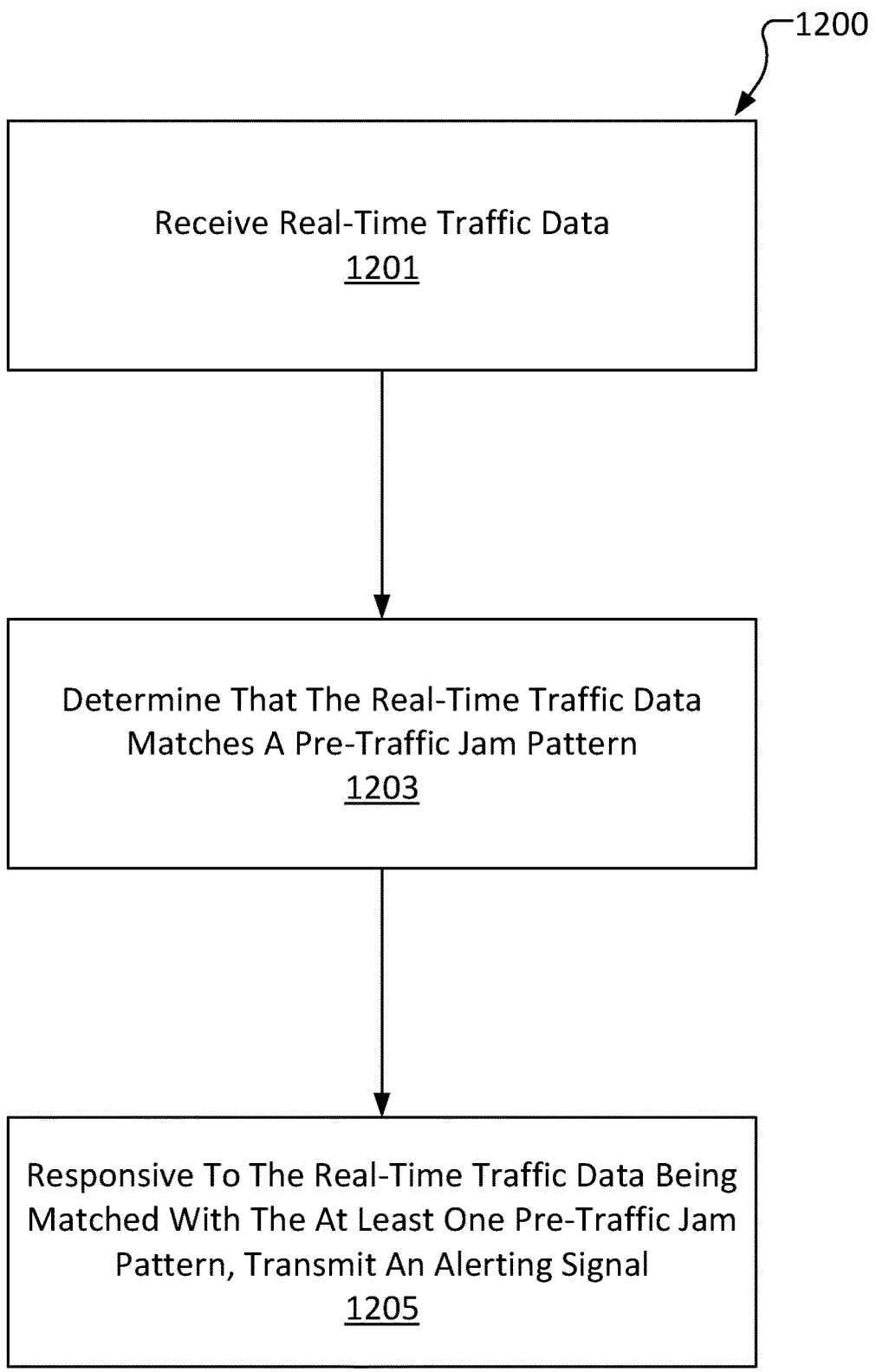
FIG. 12 depicts a flowchart of predicting traffic jam in accordance with embodiments of the present disclosure.

FIG. 12 depicts a method 1200 of predicting a traffic jam in accordance with embodiments of the present disclosure. Method 1200 may be performed by, for example, traffic jam prediction module 403 (described in detail above with reference to FIG. 4). Repetitive description of like actions employed in other embodiments described above is omitted here for sake of brevity. To summarize, method 1200 comprises receiving real-time traffic data regarding at least one driving road of at least one community at operation 1201. Method 1200 further comprises determining that the real-time traffic data matches at least one pre-traffic jam pattern at operation 1203. Method 1200 further comprises transmitting, responsive to the real-time traffic data being matched with the at least one pre-traffic jam pattern, an alerting signal for predicting a traffic jam at operation 1205.

Figure 13:
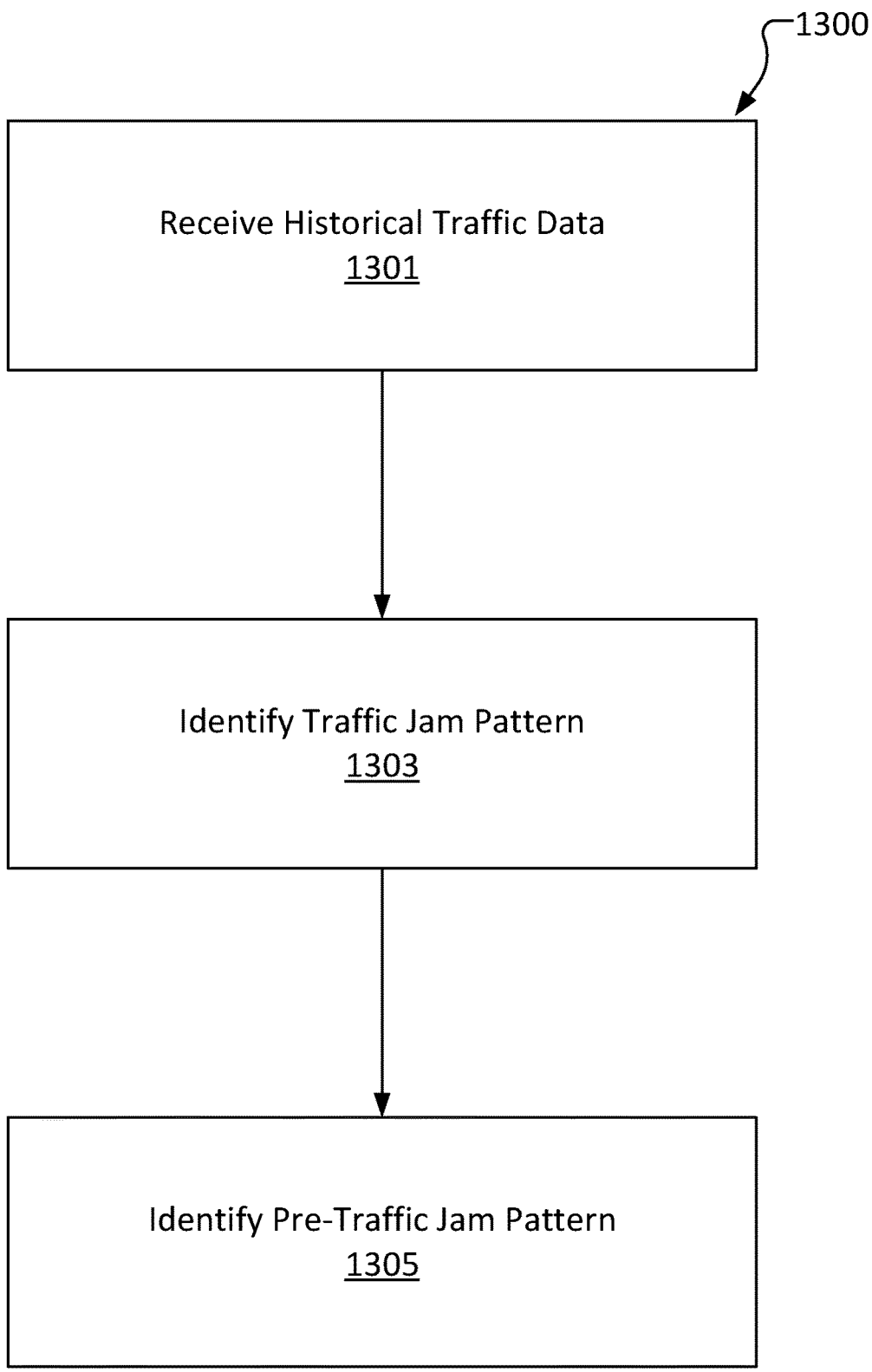
FIG. 13 depicts a flowchart of training traffic data in accordance with embodiments of the present disclosure.

FIG. 13 depicts a method 1300 of analyzing traffic data in accordance with embodiments of the present disclosure. Method 1300 may be performed by, for example, traffic data analysis module 401 (described in detail with reference to FIG. 4, above). Repetitive description of like actions employed in other embodiments described above is omitted here for sake of brevity. To summarize, method 1300 comprises receiving historical traffic data regarding at least one driving road of at least one community at operation 1301. Method 1300 further comprises identifying at least one traffic jam pattern from the received historical traffic data at operation 1303. Method 1300 further comprises identifying, responsive to the at least one traffic jam pattern being identified, at least one pre-traffic jam pattern with a likelihood of leading to the traffic jam pattern at operation 1305.

Figure 14:
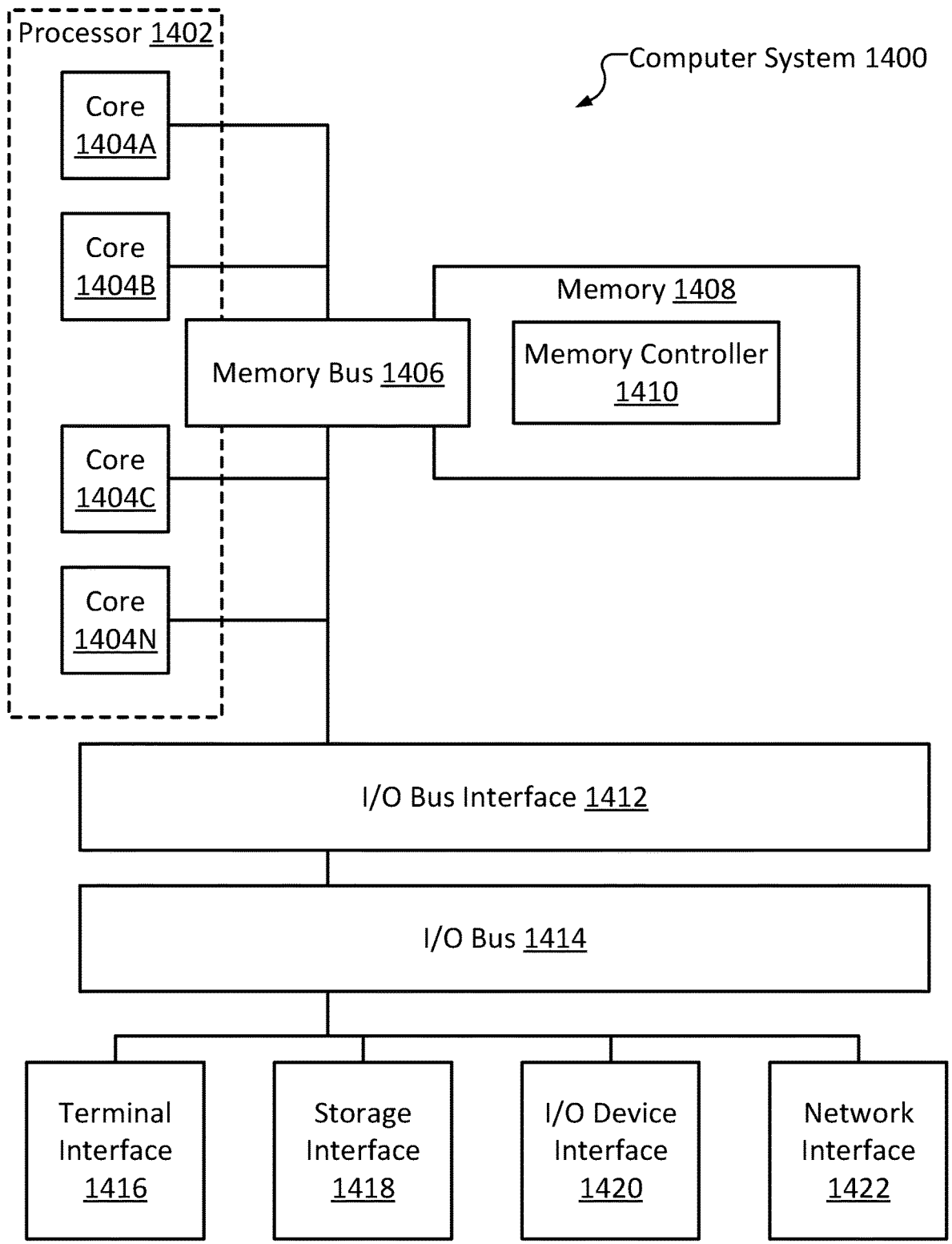
FIG. 14 illustrates a high-level block diagram of an example computer system that may be used in implementing embodiments of the present disclosure.

Referring now to FIG. 14, shown is a high-level block diagram of an example computer system 1400 that may be configured to perform various aspects of the present disclosure, including, for example, methods 1200 and 1300, respectively. The example computer system 1400 may be used in implementing one or more of the methods or modules, and any related functions or operations, described herein (e.g., using one or more processor circuits or computer processors of the computer), in accordance with embodiments of the present disclosure. In some embodiments, the major components of the computer system 1400 may comprise one or more CPUs 1402, a memory subsystem 1408, a terminal interface 1416, a storage interface 1418, an I/O (Input/Output) device interface 1420, and a network interface 1422, all of which may be communicatively coupled, directly or indirectly, for inter-component communication via a memory bus 1406, an I/O bus 1414, and an I/O bus interface unit 1412.

The computer system 1400 may contain one or more general-purpose programmable central processing units (CPUs) 1402, some or all of which may include one or more cores 1404A, 1404B, 1404C, and 1404N, herein generically referred to as the CPU 1402. In some embodiments, the computer system 1400 may contain multiple processors typical of a relatively large system; however, in other embodiments the computer system 1400 may alternatively be a single CPU system. Each CPU 1402 may execute instructions stored in the memory subsystem 1408 on a CPU core 1404 and may comprise one or more levels of on-board cache.

In some embodiments, the memory subsystem 1408 may comprise a random-access semiconductor memory, storage device, or storage medium (either volatile or non-volatile) for storing data and programs. In some embodiments, the memory subsystem 1408 may represent the entire virtual memory of the computer system 1400 and may also include the virtual memory of other computer systems coupled to the computer system 1400 or connected via a network. The memory subsystem 1408 may be conceptually a single monolithic entity, but, in some embodiments, the memory subsystem 1408 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 1408 may contain elements for control and flow of memory used by the CPU 1402. This may include a memory controller 1410.

Although the memory bus 1406 is shown in FIG. 14 as a single bus structure providing a direct communication path among the CPU 1402, the memory subsystem 1408, and the I/O bus interface 1412, the memory bus 1406 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1412 and the I/O bus 1414 are shown as single respective units, the computer system 1400 may, in some embodiments, contain multiple I/O bus interface units 1412, multiple I/O buses 1414, or both. Further, while multiple I/O interface units are shown, which separate the I/O bus 1414 from various communications paths running to the various I/O devices, in other embodiments some or all of the I/O devices may be connected directly to one or more system 110 buses.

In some embodiments, the computer system 1400 may be a multi-user mainframe computer system, a single-user system, or a server computer or similar device that has little or no direct user interface but receives requests from other computer systems (clients). Further, in some embodiments, the computer system 1400 may be implemented as a desktop computer, portable computer, laptop or notebook computer, tablet computer, pocket computer, telephone, smart phone, mobile device, or any other appropriate type of electronic device.

It is noted that FIG. 14 is intended to depict the representative major components of an exemplary computer system 1400. In some embodiments, however, individual components may have greater or lesser complexity than as represented in FIG. 14, components other than or in addition to those shown in FIG. 14 may be present, and the number, type, and configuration of such components may vary.

Embodiments of the present disclosure advantageously enable traffic jam prediction in a limited area, such as a community. Further, systems and methods consistent with the present disclosure do not depend on manual labeling of traffic data in order to recognize traffic jams. Embodiments of the present disclosure can, therefore, be quickly and automatically applied to a limited area with high prediction accuracy.

It should be noted that the method/system/computer program product for traffic data analysis and/or traffic jam prediction according to embodiments of the present disclosure could be implemented by computer system/server 12 of FIG. 1 and/or computer system 1400 of FIG. 14.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a processing unit, real-time traffic data regarding a driving road of a community, wherein the received real-time traffic data includes an array of tags representing presence of a vehicle in a lattice map of the driving road;
determining, by the processing unit, whether the real-time traffic data match a pre-traffic jam pattern; and
responsive to the real-time traffic data being matched with the pre-traffic jam pattern, transmitting, by the processing unit, an alerting signal for predicting a traffic jam.

2. The method of claim 1, wherein the pre-traffic jam pattern includes a likelihood of leading to a traffic jam pattern, the likelihood being higher than a likelihood threshold.

3. The method of claim 1, wherein the transmitting the alerting signal includes displaying, by the processing unit, an alerting message in an electronic display in the community.

4. The method of claim 2, wherein the transmitting the alerting signal includes displaying, by the processing unit, the likelihood of leading to a traffic jam pattern.

5. The method of claim 1, wherein the lattice map is obtained by splitting a part of a map of the driving road into a plurality of regions.

6. The method of claim 1, wherein the presence of the vehicle is detected from a real-time image of the driving road using an object detection method.

7. The method of claim 6, wherein the real-time image is obtained by an image capturing device installed in a place associated with the driving road.

8. The method of claim 2, wherein the traffic jam pattern represents a vehicle changing from a moving state to a stopped state in the driving road and staying in the stopped state for a period longer than a stop time threshold.

9. A computer-implemented method, comprising:
receiving, by a processing unit, historical traffic data regarding a driving road of a community, wherein the received historical traffic data includes an array of tags representing presence of a vehicle in a lattice map of the driving road;
identifying, by the processing unit, a traffic jam pattern from the received historical traffic data; and
responsive to the traffic jam pattern being identified, identifying, by the processing unit, a pre-traffic jam pattern with a likelihood of leading to the traffic jam pattern.

10. The method of claim 9, wherein the likelihood of leading to the traffic jam pattern is higher than a likelihood threshold.

11. The method of claim 9, wherein the lattice map is obtained by splitting a part of a map of the driving road into a plurality of regions.

12. The method of claim 9, wherein the presence of the vehicle is detected from an image of the driving road using an object detection method.

13. The method of claim 12, wherein the image is obtained by an image capturing device installed in a place associated with the driving road.

14. The method of claim 9, wherein the traffic jam pattern represents a vehicle changing from a moving state to a stopped state in the driving road and staying in the stopped state for a period longer than a stop time threshold.

15. A computer program product, comprising:
a computer readable storage medium having program instructions embodied therewith, the program instructions being executable by a computer to cause the computer to perform a method comprising:
receiving real-time traffic data regarding a driving road of a community, wherein the received historical traffic data includes an array of tags representing presence of a vehicle in a lattice map of the driving road;
determining whether the real-time traffic data match a pre-traffic jam pattern; and
responsive to the real-time traffic data being matched with the pre-traffic jam pattern, transmitting an alerting signal for predicting a traffic jam.

16. The computer program product of claim 15, wherein the pre-traffic jam pattern has a likelihood of leading to a traffic jam pattern, the likelihood being higher than a likelihood threshold.

17. The computer program product of claim 15, wherein the traffic jam pattern represents a vehicle changing from a moving state to a stopped state in the driving road and staying in the stopped state for a period longer than a stop time threshold.

18. The method of claim 1, wherein the array of tags further comprises tags representing directions of vehicles.

19. The method of claim 1, wherein the array of tags further comprises tags representing speeds of vehicles.

20. The method of claim 6, further comprising combining the real-time image with the lattice map.

* * * * *